United States Patent
Horioka et al.

(10) Patent No.: US 6,859,436 B2
(45) Date of Patent: Feb. 22, 2005

(54) BANDWIDTH CONTROL METHOD, CELL TRANSMITTING APPARATUS, AND TRAFFIC CONTROL SYSTEM

(75) Inventors: Kazuyuki Horioka, Chiba (JP); Satoshi Furusawa, Chiba (JP); Hideki Ohashi, Fukui (JP); Haruki Uchida, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 796 days.

(21) Appl. No.: 09/877,004

(22) Filed: Jun. 11, 2001

(65) Prior Publication Data

US 2001/0053127 A1 Dec. 20, 2001

(30) Foreign Application Priority Data

Jun. 15, 2000 (JP) .................................. 2000-179261

(51) Int. Cl.[7] .............................................. H04L 12/26
(52) U.S. Cl. ....................... 370/232; 370/235; 370/253
(58) Field of Search ................................ 370/232, 412, 370/229, 230, 231–233, 235–238.1

(56) References Cited

U.S. PATENT DOCUMENTS

| | | | | |
|---|---|---|---|---|
| 5,987,031 A | * | 11/1999 | Miller et al. ................ | 370/412 |
| 6,018,518 A | * | 1/2000 | Smallwood et al. ........ | 370/235 |
| 6,252,847 B1 | * | 6/2001 | Lee ............................ | 370/229 |
| 6,327,247 B1 | * | 12/2001 | Naudts ....................... | 370/232 |
| 6,331,970 B1 | * | 12/2001 | Nieh et al. .................. | 370/230 |
| 6,377,550 B1 | * | 4/2002 | Prasad ....................... | 370/236.1 |
| 6,442,140 B1 | * | 8/2002 | Kirschenbaum ........... | 370/236.1 |
| 6,452,903 B1 | * | 9/2002 | Peck et al. .................. | 370/235 |
| 6,466,541 B1 | * | 10/2002 | Peck ........................... | 370/229 |
| 6,512,743 B1 | * | 1/2003 | Fang .......................... | 370/232 |
| 6,597,662 B1 | * | 7/2003 | Kumar et al. ............... | 370/236 |
| 6,744,733 B2 | * | 6/2004 | Kamo ........................ | 370/236.1 |
| 6,751,195 B1 | * | 6/2004 | Watanabe .................. | 370/236.1 |

* cited by examiner

Primary Examiner—Phirin Sam
Assistant Examiner—Anthony Ton
(74) Attorney, Agent, or Firm—Venable LLP; Michael A. Sartori

(57) ABSTRACT

A cell transmitting device receives cells for transmission to a cell receiving device on a connection in a communication network. The connection has a minimum cell rate, established when the connection is set up. The cell transmitting device measures the input rate of cells to be transmitted on the connection, determines an allowable cell rate on the basis of the input rate and cell rate information supplied by the cell receiving apparatus, and transmits cells within the allowable cell rate. Under certain conditions, such as absence of cell traffic on the connection, the allowable cell rate is set to a lowest cell rate lower than the minimum cell rate, thereby enabling other connections to obtain higher cell rates.

11 Claims, 5 Drawing Sheets

| Conn | IR(M) | PCR(M) | MCR(M) | ACR(M) | CCR(M) | ECR(M) |
|------|-------|--------|--------|--------|--------|--------|
| a | 2.0 | 8.0 | 2.0 | 2.0 | 2.0 | 2.0 |
| b | 2.0 | 8.0 | 2.0 | 2.0 | 2.0 | 2.0 |
| c | 2.0 | 8.0 | 2.0 | 2.0 | 2.0 | 2.0 |
| d | 2.0 | 8.0 | 2.0 | 2.0 | 2.0 | 2.0 |

| Conn | IR(M) | PCR(M) | MCR(M) | ACR(M) | CCR(M) | ECR(M) |
|---|---|---|---|---|---|---|
| a | 2.0 | 8.0 | 2.0 | 2.0 | 2.0 | 2.0 |
| b | 2.0 | 8.0 | 2.0 | 2.0 | 2.0 | 2.0 |
| c | 2.0 | 8.0 | 2.0 | 2.0 | 2.0 | 2.0 |
| d | 0 | 8.0 | 2.0 | 2.0 | 2.0 | 2.0 |

| Conn | IR(M) | PCR(M) | MCR(M) | ACR(M) | CCR(M) | ECR(M) |
|---|---|---|---|---|---|---|
| a | 2.0 | 8.0 | 2.0 | 2.0 | 2.0 | 4.0−LCR |
| b | 2.0 | 8.0 | 2.0 | 2.0 | 2.0 | 4.0−LCR |
| c | 2.0 | 8.0 | 2.0 | 2.0 | 2.0 | 4.0−LCR |
| d | 0 | 8.0 | 2.0 | LCR | LCR | 2.0 |

FIG.9

| Conn | IR(M) | PCR(M) | MCR(M) | ACR(M) | CCR(M) | ECR(M) |
|---|---|---|---|---|---|---|
| a | 2.0 | 8.0 | 2.0 | 2.0 | 2.0 | 2.0 |
| b | 2.0 | 8.0 | 2.0 | 2.0 | 2.0 | 2.0 |
| c | 2.0 | 8.0 | 2.0 | 2.0 | 2.0 | 2.0 |
| d | 1.0 | 8.0 | 2.0 | 2.0 | 2.0 | 2.0 |

FIG.10

| Conn | IR(M) | PCR(M) | MCR(M) | ACR(M) | CCR(M) | ECR(M) |
|---|---|---|---|---|---|---|
| a | 2.0 | 8.0 | 2.0 | 2.0 | 2.0 | 3.0 |
| b | 2.0 | 8.0 | 2.0 | 2.0 | 2.0 | 3.0 |
| c | 2.0 | 8.0 | 2.0 | 2.0 | 2.0 | 3.0 |
| d | 1.0 | 8.0 | 2.0 | 1.0 | 1.0 | 2.0 |

BANDWIDTH CONTROL METHOD, CELL TRANSMITTING APPARATUS, AND TRAFFIC CONTROL SYSTEM

BACKGROUND OF THE INVENTION

The present invention relates to a cell transmitting apparatus and traffic control system suitable, for example, for control of available-bit-rate traffic in a communication network employing the asynchronous transfer mode.

The asynchronous transfer mode (ATM) provides various service categories, so that the user can select the type of service best suited for the type of data to be transmitted (audio data, video data, various other types of data, or a mixture thereof). Available bit rate (ABR) is one of the service categories. In ABR service, a minimum cell rate and a peak cell rate are established for a connection when the connection is set up, and the network tries to provide the best quality of service for as much traffic as it can handle within these limits.

ABR service is managed by the use of resource management (RM) cells, which are circulated between the source and destination nodes of a connection, establishing a feedback control loop between those two nodes. When a forward resource management (FRM) cell is transmitted toward the destination node of the connection, intermediate nodes such as ATM switches may add congestion information. The destination node places this congestion information in a backward resource management (BRM) cell that it sends back toward the source node. As the BRM cell passes through the intermediate nodes, these nodes may now add or modify explicit rate information indicating the cell rates they can allow on the connection. As a result, the source node receives congestion information and explicit rate information, on the basis of which it can control its cell transmission rate so as to avoid cell loss.

In a variation of this scheme, one or more of the intermediate ATM switches acts as a virtual source (VS) and virtual destination (VD), receiving FRM cells, converting them to BRM cells, sending the BRM cells back toward the source node, generating new FRM cells, and sending them toward the destination node. The single feedback loop between the source node and destination node is thereby split up into two or more smaller loops, each of which can react more quickly to changing network conditions.

In both the basic scheme and this variation, the ATM switches respect the minimum and peak cell rates established for each connection. Accordingly, if a connection has a non-zero minimum cell rate, each intermediate ATM switch will manage its bandwidth and other resources so as to support at least the designated minimum cell rate, even when the source node of the connection is transmitting cells at less than the minimum cell rate.

A resulting disadvantage is that a source node having a non-zero minimum cell rate can tie up network resources unnecessarily, thereby reducing the amount of ABR traffic that the network can carry.

SUMMARY OF THE INVENTION

An object of the present invention is to provide a cell transmitting apparatus and traffic control system that control traffic efficiently.

The invention provides a method of controlling the rate at which a cell transmitting apparatus is allowed to transmit cells to a cell receiving apparatus through a connection having a minimum cell rate, which is determined when the connection is set up. The method includes the following steps:

establishing a lowest cell rate, lower than the minimum cell rate;

measuring the rate at which the cell transmitting apparatus receives cells to transmit on the connection;

receiving cell rate information from the cell receiving apparatus; and determining an allowable cell rate from at least the input rate and the cell rate information, the allowable cell rate being set at the lowest cell rate under a certain condition in which the input rate is lower than the minimum cell rate.

The certain condition may be, for example, absence of cell traffic on the connection, or cell traffic less than the lowest cell rate. In the latter case, if the input rate is intermediate between the lowest cell rate and the minimum cell rate, the allowable cell rate may be set to the input rate.

The invented method prevents a source node that obtains a non-zero minimum cell rate from unnecessarily monopolizing network resources.

The invention also provides a cell transmitting apparatus using the invented method, and a traffic control system including this cell transmitting apparatus.

BRIEF DESCRIPTION OF THE DRAWINGS

In the attached drawings:

FIG. 9 illustrates traffic control parameters determined by conventional methods when one of the four connections in FIG. 5 becomes less active; and FIG. 10 illustrates traffic control parameters determined by the methods of in FIGS. 8 and 4 when one of the four connections in FIG. 5 becomes less active.

DETAILED DESCRIPTION OF THE INVENTION

ATM switches embodying the invention will be described with reference to the attached drawings.

Figure 1:
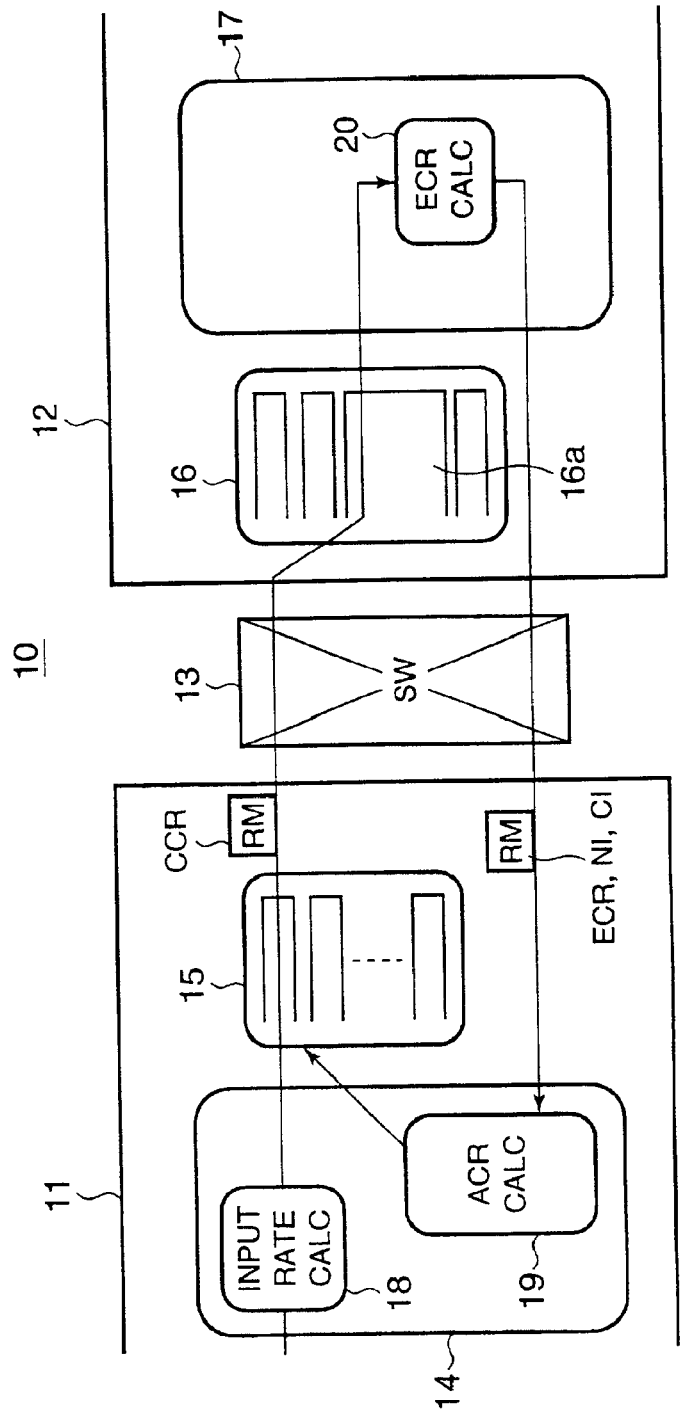
FIG. 1 is a block diagram of an ATM switch embodying the present invention.

Referring to FIG. 1, the first embodiment is an ATM switch 10 comprising an input line interface 11, an output line interface 12, and a switching apparatus (SW) 13. The input line interface 11 functions as a cell transmitting apparatus, transmitting cells into the switching apparatus 13. The output line interface 12 functions as a cell receiving apparatus, receiving cells from the switching apparatus 13. The input line interface 11 comprises an input ABR control unit 14 and a virtual channel shaper (VCS) 15. The output line interface 12 comprises a virtual path shaper (VPS) 16 and an output ABR control unit 17. The input ABR control unit 14 includes an input rate calculation unit (CALC) 18 and an allowed cell rate (ACR) calculation unit 19. The output ABR control unit 17 includes an explicit cell rate (ECR) calculation unit 20. The two ABR control units 14, 17 constitute an ABR traffic control system.

The explicit cell rate (ECR) is often referred to simply as an explicit rate (ER), but the acronym ECR will be used herein.

Figure 2:
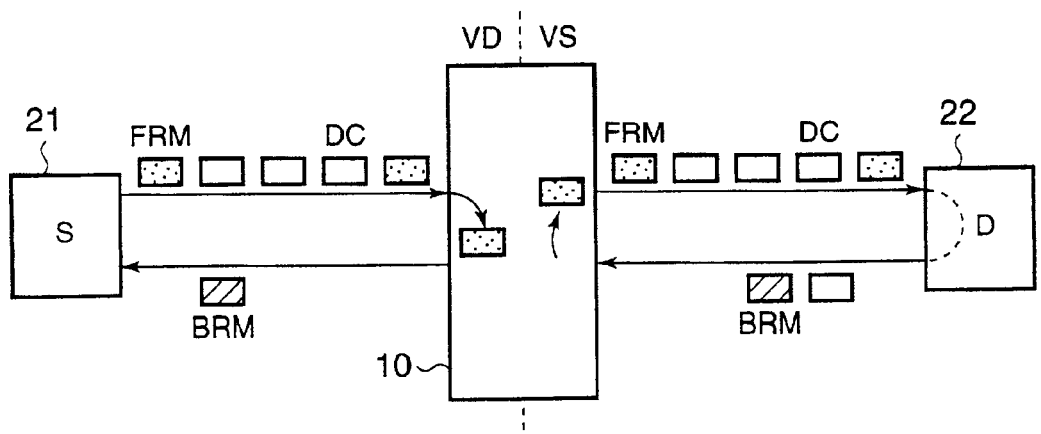
FIG. 2 is a simplified diagram of an ABR connection through the ATM switch in FIG. 1.

FIG. 2, shows an ABR connection from a source node (S) 21 to a destination node (D) 22, passing through the ATM switch 10. The source node 21 and destination node 22 may follow conventional traffic control procedures, as will be assumed below. The connection is defined by, for example, a virtual path identifier (VPI) and a virtual channel identifier (VCI), which are placed in the headers of the cells transmitted on the connection. Normally, the ATM switch 10 handles many ABR connections simultaneously.

The source node 21 sends data cells (DC) and forward resource management (FRM) cells to the ATM switch 10, transmitting one FRM cell for every N data cells, where N is a predetermined positive integer.

The ATM switch 10 sends the received data cells onward to the destination node 22, terminates the received FRM cells, generates backward resource management (BRM) cells which it sends back to the source node 21, generates new FRM cells which it sends to the destination node 22, and terminates BRM cells received from the destination node 22. The ATM switch 10 thus behaves as a virtual destination (VD) as seen from the source node, and as a virtual source (VS) as seen from the destination node.

The FRM and BRM cells include, among other items, a direction (DIR) bit, a congestion indication (CI) bit, a no increase (NI) bit, and a current cell rate octet (CCR octet, included in FRM cells) or an explicit cell rate octet (ECR octet, included in BRM cells). To generate a BRM cell to send back to the source node 21, the ATM switch 10 copies the contents of the FRM cell received from the source node 21, changing the direction bit to designate the backward direction (DIR=1), and copying the CCR value to the ECR octet. If the ATM switch 10 is currently experiencing or anticipating congestion, it may also set the CI bit or the NI bit. The ATM switch may furthermore reduce the ECR value to a value lower than the CCR value.

When the source node 21 receives a BRM cell, it reduces its current cell rate (CCR) if the CI bit is set. If the CI bit is not set, the source node 21 increases its current cell rate, without exceeding the peak cell rate (PCR) established when the connection was set up, unless the NI bit is set. If the ECR value is lower than the CCR value, however, the source node 21 reduces its current cell rate to the ECR value, unless the ECR value is less than the minimum cell rate (MCR) established when the connection was set up, in which case, the source node reduces its current cell rate to the MCR value.

The current cell rate (CCR) is the maximum rate at which the source node 21 will transmit cells. The actual cell transmission rate may be lower than the CCR value.

A similar process is carried out for the link between the ATM switch 10 and the destination node 22. When the destination node 22 receives an FRM cell from the ATM switch 10, it makes necessary alterations such as setting the direction bit, and sends the altered cell back to the ATM switch 10 as a BRM cell. The ATM switch 10 terminates these BRM cells and does not pass them on to the source node 21.

In addition to sending and receiving the FRM and BRM cells shown in FIG. 2, the ATM switch 10 generates RM cells that it uses internally for traffic control, as described below.

Referring again to FIG. 1, the input rate calculation unit 18 calculates the input rate (IR) of each ABR connection by measuring the rate at which data cells belonging to the connection are received.

The allowable cell rate calculation unit 19 calculates an allowable cell rate (ACR) for each ABR connection, and notifies the virtual channel shaper 15 of the calculated ACR value. Methods of calculating the ACR value will be described later.

The virtual channel shaper 15 maintains a separate queue for each ABR connection, stores arriving ABR cells in the corresponding queues, and takes cells from each queue at a rate limited by the corresponding ACR value supplied by the allowable cell rate calculation unit 19, thereby shaping the ABR cell traffic transmitted into the switching apparatus 13. The virtual channel shaper 15 also generates and transmits RM cells for each ABR connection. These RM cells are similar to the FRM cells described above. The ACR value calculated by the allowable cell rate calculation unit 19 is placed in the CCR octet of these RM cells. The CCR octet thus indicates the maximum rate at which cells may be transmitted through the switching apparatus 13 on the relevant connection.

The switching apparatus 13 switches the cell traffic according to header information in the incoming cells.

The virtual path shaper 16 maintains a separate queue for each service class, and provides traffic shaping on a service-class basis. At least one of the queues is an ABR queue 16a. The connections sharing a single ABR queue in the virtual path shaper 16 will be referred to as an ABR connection group. There may be, for example, a separate ABR queue and thus a separate ABR connection group for each virtual path, but for simplicity, only one ABR queue 16a and one ABR connection group will be considered below. Cells belonging to ABR connections in the ABR connection group are placed in the ABR queue 16a, then taken from the ABR queue 16a and transmitted toward their various destinations.

The ABR connection group has an assigned group bandwidth Bg that specifies the rate at which cells can be taken from the ABR queue 16a. Bg represents the bit rate available for use by the ABR connection group.

The output ABR control unit 17 receives RM cells taken from the ABR queue 16a, adds information to them or alters information in them, and returns the RM cells to the input line interface 11. The returned RM cells are similar to the BRM cells described above.

The explicit cell rate calculation unit 20 is one of several units in the output ABR control unit 17 that manipulate the information in the RM cells (the other units are not shown) When the explicit cell rate calculation unit 20 receives an RM cell, it calculates an explicit cell rate (ECR) for the connection to which the RM cell belongs. The ECR value represents the maximum share of the bandwidth Bg that can be used by the connection. The ECR calculation procedure will be described later. The ECR value is written into the ECR octet in the RM cell, which is then sent back through the switching apparatus 13 to the input ABR control unit 14.

Next, the operation of the ATM switch 10 will be described. The description will be limited to the management of ABR traffic.

Incoming ABR data cells are counted by the input rate calculation unit 18, enqueued in the virtual channel shaper 15, dequeued at the allowable cell rates calculated by the allowable cell rate calculation unit 19, and sent into the switching apparatus 13. Emerging from the switching apparatus 13, they are placed in the ABR queue 16a in the virtual path shaper 16, dequeued at a rate limited by the assigned ABR group bandwidth Bg, and sent onward toward their destinations.

For each ABR connection, the virtual channel shaper 15 generates RM cells according to a predetermined rule: for example, at predetermined time intervals, or at intervals of a predetermined number of data cells. As noted above, each RM cell includes a current cell rate (CCR) octet with a value equal to the allowable cell rate calculated by the allowable cell rate calculation unit 19.

The allowable cell rate calculation unit 19 calculates the allowable cell rate when it receives an RM cell from the output line interface 12. In general, the allowable cell rate can be calculated in various ways from some or all of the following (and other) information: the peak cell rate (PCR), the minimum cell rate (MCR), the input rate (IR), the explicit cell rate (ECR), the no increase (NI) bit, and the congestion indication (CI) bit. In the present embodiment, the allowable cell rate is calculated by the process illustrated in FIG. 3.

Figure 3:
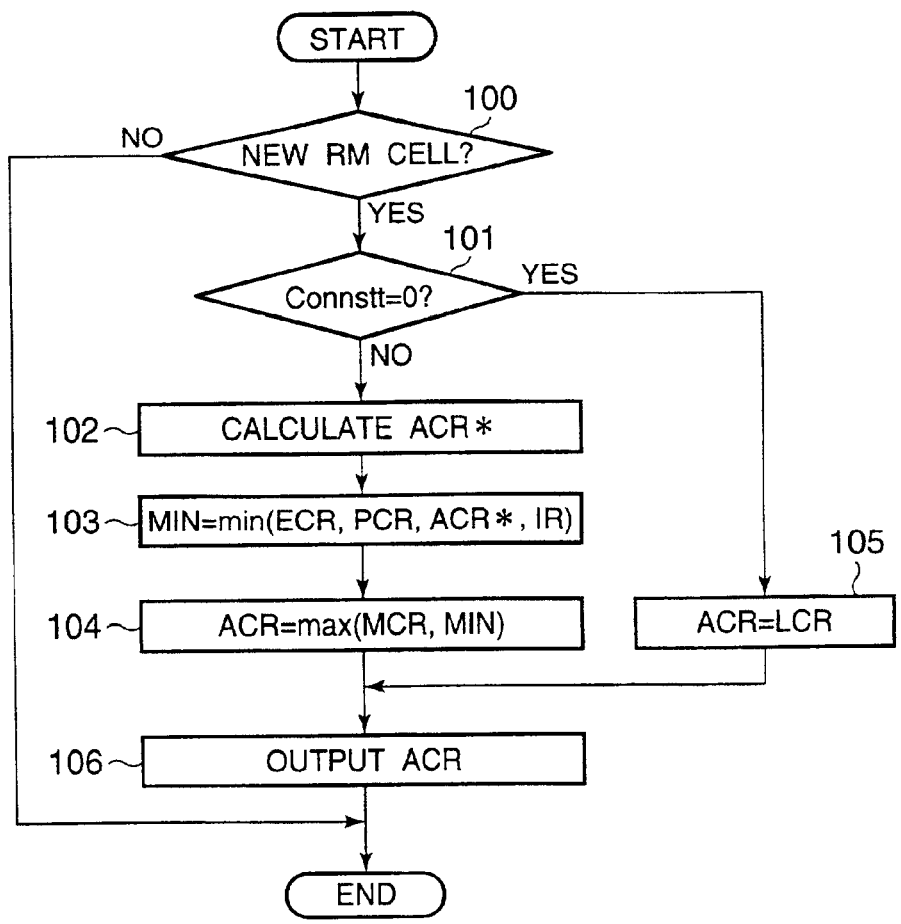
FIG. 3 is a flowchart illustrating a method of calculating an allowable cell rate.

The process in FIG. 3 is executed at regular intervals, such as once per cell interval. It makes use of a connection status flag (Connstt) that indicates whether a connection is currently active or inactive, being set to '1' to indicate activity (cell traffic present), and cleared to '0' to indicate inactivity (no cell traffic). Connstt is set and cleared by the input rate calculation unit 18, for example, according to the input rate of the connection. Alternatively, Connstt may be set and cleared according to the presence or absence of cells in the corresponding queue in the virtual channel shaper 15.

The first step is to decide whether a new RM cell has been received from the output line interface 12 (step 100). The process ends if a new RM cell has not been received.

Next, the header of the RM cell is read to determine the ABR connection to which the RM cell belongs, and the Connstt flag of the connection is checked (step 101). If Connstt is set to '1,' indicating that the connection is active, then the ACR value is calculated in steps 102 to 104. If Connstt is cleared to '0,' indicating that the connection is inactive, then the ACR value is calculated in step 105.

If the connection is active, the allowable cell rate calculation unit 19 calculates a candidate cell rate ACR* according to, for example, congestion information such as the NI and CI bits mentioned above (step 102). A recommended method of calculating ACR* is given in section 5.10.4 (Source Behavior) of the ATM Forum Traffic Management Specification, Version 4. This calculation often produces an ACR* value that is too high in view of the connection's peak cell rate (PCR), explicit cell rate (ECR), or current input rate (IR), or too low in view of the connection's minimum cell rate (MCR). Accordingly, the minimum (MIN) of the ECR, PCR, ACR*, and IR values is taken (step 103); then the maximum (max) of the MCR and MIN values is taken as the ACR value (step 104). The entire calculation is summarized in the following equation (1).

$$ACR = \max\{MCR, \min(ECR, PCR, ACR^*, IR)\} \quad (1)$$

If the connection is inactive, the ACR value is set equal to a predetermined lowest cell rate LCR (step 105). The same LCR value is used for all ABR connections. The LCR value is preferably lower than the lowest MCR value that can be established for a connection.

Finally, the ACR value obtained in step 104 or step 105 is output to the virtual channel shaper 15 (step 106). This output step is performed regardless of whether or not the connection is active.

The allowable rate calculation unit 19 can be implemented in either hardware or software. If implemented in software, steps 101 to 105 in FIG. 3 can be expressed in programming-language form as follows:

if (Connstt=0)
ACR=LCR
else
ACR=max{MCR, min(ECR, PCR, ACR*, IR)}

After being processed in the switching apparatus 13, RM cells, like ABR data cells, are queued in the virtual path shaper 16. Upon being dequeued, they are processed by the output ABR control unit 17, which sets information such as the above-mentioned congestion indication bit CI and no increase bit NI, and the explicit cell rate ECR. After this processing, the RM cells are returned to the input line interface 11.

Figures 4, 5:
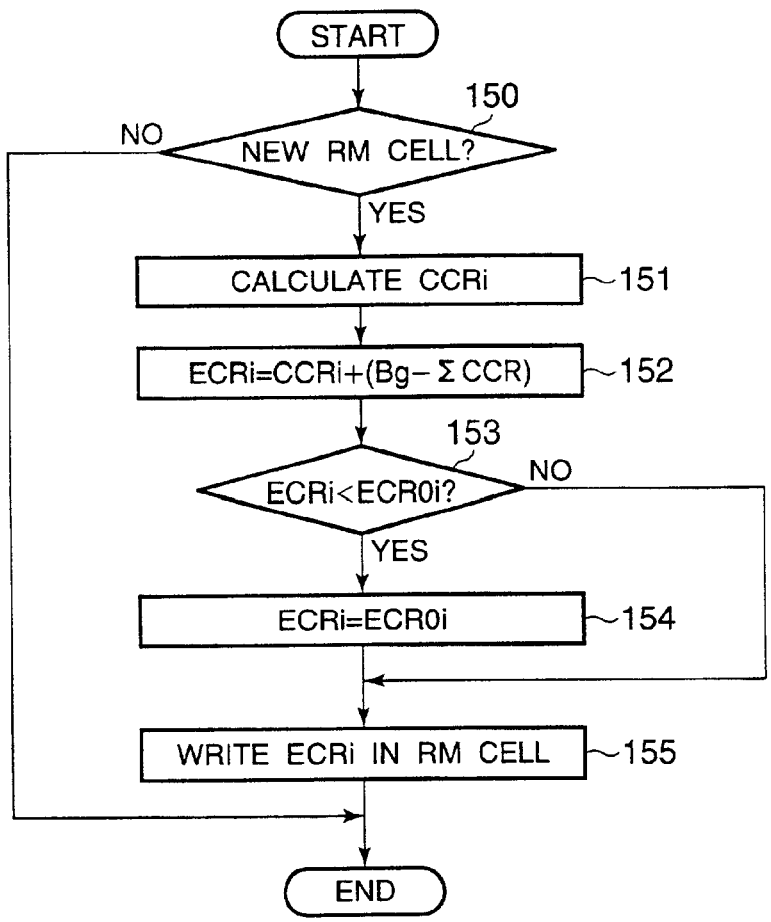
FIG. 4 is a flowchart illustrating a method of calculating an explicit cell rate.
FIG. 5 illustrates traffic control parameters for four connections operating at their minimum cell rates.

The explicit cell rate calculation unit 20 in the output ABR control unit 17 calculates the ECR value by the process illustrated in FIG. 4. The explicit cell rate calculation unit 20 executes this process at regular intervals, such as once per cell interval.

The first step is to decide whether a new RM cell has been received from the virtual path shaper 16 (step 150). The process ends if a new RM cell has not been received.

If a new RM cell has been received, its header is read to determine which ABR connection it belongs to. The connection will be denoted below by the letter i. The CCR octet of the cell is also read to determine the current cell rate CCRi of this connection (step 151).

Next, the explicit cell rate calculation unit 20 subtracts the sum of the current cell rates of all connections in the ABR connection group from the bandwidth Bg allocated to the ABR connection group, and adds the resulting positive or negative difference to the CCRi value to obtain a provisional ECR value ECRi (step 152). This value is given by the following equation (2).

$$ECRi = CCRi + (Bg - \Sigma CCR) \quad (2)$$

The explicit cell rate calculation unit 20 also calculates a minimum explicit cell rate ECR0i to be guaranteed for connection i, by dividing the minimum cell rate MCRi of connection i by the sum of the minimum cell rates MCR of all connections in the ABR connection group, and multiplying the quotient by the group bandwidth Bg (step 153). The ECR0i value, which can be interpreted as a minimum fair share of the bandwidth Bg, is given by equation (3) below, in which the asterisk indicates multiplication.

$$ECR0i = (MCRi/\Sigma MCR)^* Bg \quad (3)$$

The provisional explicit cell rate ECRi is now compared with the minimum explicit cell rate ECR0i (step 153).

If the provisional explicit cell rate ECRi is less than the minimum explicit cell rate ECR0i, then the explicit cell rate ECRi is altered to the minimum explicit cell rate ECR0i (step 154). Otherwise, the explicit cell rate ECRi is left unaltered.

Finally, the explicit cell rate ECRi is written into the received RM cell (step 155), and this cell is sent back to the input ABR control unit 14, where it is used in determining the allowed cell rate of connection i for the interval until the next RM cell is generated for this connection.

The method of ACR calculation described in FIG. 3 has the advantage that when a connection is inactive, its ACR value is forced to the lowest cell rate, and an amount of bandwidth equal to the difference between the lowest cell rate and the minimum cell rate (MCR−LCR) is freed up for distribution to other ABR connections by the process shown in FIG. 4.

The effect of the first embodiment will be demonstrated through comparison with a conventional method in which the allowable cell rate ACR is always calculated as in equation (1) above, regardless of whether the connection is active or not. The comparison will be illustrated for an ABR connection group with four connections (a, b, c, d). The group bandwidth Bg of this group is eight megabits per second (8 Mbps). Each connection has a peak cell rate equivalent to the group bandwidth (8 Mbps), and a minimum cell rate equivalent to two megabits per second (2 Mbps). The lowest cell rate is a positive rate less than these minimum cell rates (0<LCR<2 Mbps).

FIG. 5 summarizes the behavior of this group when each connection transmits data cells at its minimum cell rate. The input rate IR, peak cell rate PCR, minimum cell rate MCR, allowable cell rate ACR, current cell rate CCR, and explicit cell rate ECR of each connection (Conn) are shown in megabits per second (M). Since IR is equal to MCR, it follows from equation (1) that ACR is also equal to MCR, for each connection. Each CCR is therefore also equal to MCR (2.0 Mbps), and the sum of the four CCR values is equal to the group bandwidth Bg (8.0 Mbps). Since there is no bandwidth excess or deficit (Bg−ΣCCR=8.0−8.0=0), from equations (2) and (3), the explicit cell rate calculation unit 20 in the output ABR control unit 17 sets ECR equal to CCR (2.0 Mbps) for each connection.

Figures 6, 7, 8:
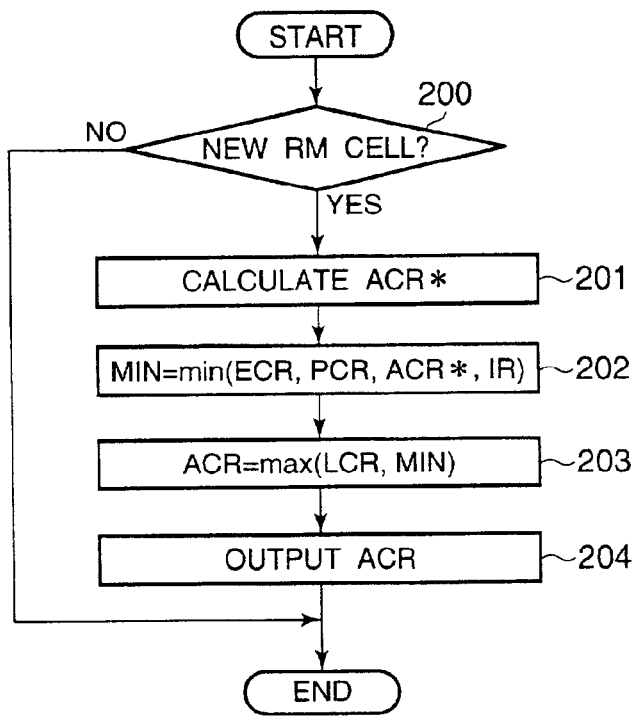
FIG. 6 illustrates traffic control parameters determined by conventional methods when one of the four connections in FIG. 5 becomes inactive.
FIG. 7 illustrates traffic control parameters determined by the methods of FIGS. 3 and 4 when one of the four connections in FIG. 5 becomes inactive.
FIG. 8 is a flowchart illustrating another method of calculating an allowable cell rate.

FIG. 6 illustrates the behavior of this group when one connection (d) stops transmitting, if the conventional method of calculating allowable cell rates is used. The input rate of this connection (d) becomes zero (IR=0). From equation (1), its allowable cell rate is still the minimum cell rate (ACR=2.0 Mbps), so its current cell rate is also that rate (CCR=2.0 Mbps). The sum of the four CCR values is again equal to the group bandwidth Bg (8.0 Mbps). Accordingly, no excess bandwidth is detected, and the explicit cell rate calculation unit 20 in the output ABR control unit 17 sets ECR equal to CCR (2 Mbps) for each connection. Each connection is thus limited to its minimum cell rate, despite the existence of two megabits of unused group bandwidth (Bg−ΣIR=8.0−6.0=2.0 Mbps).

FIG. 7 illustrates the behavior of the first embodiment when one connection (d) stops transmitting. Since its input rate is zero, the input rate calculation unit 18 clears its connection status flag (Connstt) to zero, causing the allowable cell rate calculation unit 19 to set the ACR value to the lowest cell rate (LCR). The current cell rate of this connection (d) is therefore also equal to the lowest cell rate (CCR=LCR). The explicit cell rate calculation unit 20 now detects excess bandwidth (Bg−ΣCCR=8.0−(6.0+LCR)−2.0−LCR). Adding this excess to the current cell rate of each connection, the explicit cell rate calculation unit 20 increases the ECR values of the active connections (a, b, c) from 2.0 Mbps to 4.0 Mbps−LCR, while the ECR value of the inactive connection (d) remains 2.0 Mbps.

Accordingly, if one of the active connections (a, b, c) later becomes even more active, it can increase its cell rate by using the excess bandwidth (2.0−LCR), which was not possible with the conventional method of ACR calculation.

This example illustrates the advantage of the first embodiment that was mentioned above. An active connection can use extra bandwidth equal to the difference between the minimum cell rate of an inactive connection and the lowest cell rate (MCR−LCR).

In a variation of the first embodiment, a connection is determined to be inactive when its input rate is less than a predetermined fraction β of its minimum cell rate (Connstt=0 if IR<β×MCR, where 0<β<1).

Next, a second embodiment will be described. The second embodiment has the same structure as the first embodiment, illustrated in FIG. 1, but the allowable cell rate calculation unit 19 uses a different method to calculate the allowable cell rates.

In the second embodiment, the allowable cell rate (ACR) of a connection is calculated by the process illustrated in FIG. 8. The allowable cell rate calculation unit 19 waits for an RM cell to arrive from the output line interface 12 (step 200), calculates a candidate ACR* value as described above (step 201), calculates the minimum of the explicit cell rate ECR, peak cell rate PCR, candidate allowable cell rate ACR*, and input rate IR of the connection (step 202), then takes the maximum of this minimum value (MIN) and the lowest cell rate (LCR) as the ACR value (step 203). In the second embodiment, the same lowest cell rate is used for all ABR connections, and this lowest cell rate is lower than the smallest minimum cell rate (MCR) that can be established for a connection. The entire calculation is summarized in the following equation (4).

$$ACR = \max\{LCR, \min(ECR, PCR, ACR^*, IR)\} \quad (4)$$

After this calculation, the ACR value is output to the virtual channel shaper 15 (step 204).

The second embodiment frees up additional bandwidth whenever the input rate (IR) of a connection falls below the minimum cell rate of the connection, by reducing the allowable cell rate of the connection to the input rate or the lowest cell rate (LCR), whichever is greater, even if the connection does not become completely inactive.

The effect of the second embodiment will be demonstrated through comparison with the conventional method mentioned above, in which the allowable cell rate ACR is always calculated as in equation (1). The ABR connection group will be the one used to demonstrate the first embodiment, with a group bandwidth Bg of 8.0 Mbps.

FIGS. 9 and 10 illustrate the behavior of this group when three of the connections (a, b, c) transmit at their minimum cell rate (2.0 Mbps) and one connection (d) transmits at half that rate (1.0 Mbps), assuming that the lowest cell rate is less than one-half the minimum cell rate (0<LCR<1.0 Mbps).

FIG. 9 illustrates the conventional behavior. From equation (1), the allowable cell rate of the less active connection (d) is the minimum cell rate (ACR=2.0 Mbps). This value becomes the current cell rate (CCR=2.0 Mbps). As explained in the first embodiment, the explicit cell rate calculation unit 20 in the output ABR control unit 17 detects no excess bandwidth, and sets the ECR value of each connection to 2.0 Mbps, limiting each connection to its minimum cell rate.

FIG. 10 illustrates the behavior of the second embodiment. From equation (4), the allowable cell rate of the less active connection (d) is equal to its input rate (ACR=IR=1.0 Mbps), and this value also becomes the current cell rate of that connection. The explicit cell rate calculation unit 20 now detects 1.0 Mbps of excess bandwidth (Bg−ΣCCR=8.0−7.0=1.0). Adding this excess to the current cell rate of each connection, the explicit cell rate calculation unit 20 increases the ECR values of the more active connections (a, b, c) to 3.0 Mbps, while the ECR value of the less active connection (d) remains 2.0 Mbps.

Accordingly, if one of the first three connections (a, b, c) later becomes even more active, it can increase its cell rate by using up to 1.0 Mbps of additional bandwidth. This was not possible in the first embodiment, or with the conventional method of calculating ACR values.

In the second embodiment, whenever the input rate (IR) of a connection drops below its minimum cell rate (MCR), additional bandwidth is made available to other connections. The amount of additional bandwidth is the difference between the minimum cell rate and the input rate (MCR–IR), or the difference between the minimum cell rate and the lowest cell rate (MCR–LCR), whichever difference is less.

As in the first embodiment, the allowable cell rate of a connection is never less than the lowest cell rate (LCR), even if the input rate goes below the LCR level. Moreover, when the input rate rises above the LCR level, the allowable cell rate is quickly increased to a level above the LCR level.

The difference between the first and second embodiments, is that in the second embodiment, the allowable cell rate can take on arbitrary values between the lowest cell rate and the minimum cell rate, permitting more precise bandwidth control than in the first embodiment.

In practice, the first and second embodiments have substantially the same effect, because when the source node in an ABR connection transmits any data cells at all, it almost always transmits at a rate exceeding the minimum cell rate. For this reason, the omission of the minimum cell rate from the process of determining the allowable cell rate in the second embodiment rarely leads to problems. It is rather the inclusion of the minimum cell rate in the conventional determination of the allowable cell rate that is likely to cause problems, when the input rate falls below the minimum cell rate.

The two embodiments above can be combined by the use of two lowest cell rates LCR1 and LCR2 (where LCR1<LCR2). When there is no cell traffic on a connection, its allowable cell rate is determined as in the first embodiment, using LCR1. When cell traffic is present, the allowable cell rate is determined as in the second embodiment, using LCR2.

In a variation of the two preceding embodiments, the lowest cell rate is not fixed, but is calculated for each ABR connection group on the basis of the group bandwidth and the number of connections in the group. For example, the lowest cell rate may be a fraction P(n) of the group bandwidth Bg (LCR=P(n)×Bg), where n is the number of connections in the group and P(n) is a predetermined function of n.

Alternatively, the lowest cell rate may be calculated separately for each connection, as a predetermined fraction α of the minimum cell rate of the connection (LCR=α× MCR, where 0<α<1).

In the preceding embodiments, RM cells are sent from a single input line interface 11 to a single output line interface 12, but there may be multiple input line interfaces, multiple output line interfaces, or multiple line interfaces of both types.

The ABR traffic control loop in the preceding embodiments operates within a single ATM switch 10, but the invention can also be applied to other control loops, such as a loop between a source node and an ATM switch, in which the ATM switch acts as a virtual destination, or a loop between an ATM switch and a destination node, in which the ATM switch acts as a virtual source.

The invention is not restricted to traffic management of ABR service in an ATM network, but can be practiced in any type of communication network in which individual connections have minimum bandwidths that the network undertakes to guarantee.

Those skilled in the art will recognize that further variations are possible within the scope claimed below.

What is claimed is:

1. A method of controlling a rate at which a cell transmitting apparatus is allowed to transmit cells to a cell receiving apparatus through a connection in a communication network, the connection having a minimum cell rate determined when the connection is set up, the method comprising the steps of:

(a) establishing a lowest cell rate lower than the minimum cell rate;

(b) measuring an input rate at which the cell transmitting apparatus is currently receiving cells to transmit on the connection;

(c) receiving cell rate information from the cell receiving apparatus; and (d) determining an allowable cell rate within which the cell transmitting apparatus may transmit said cells on the connection, the allowable cell rate being determined from at least said input rate and said cell rate information, the allowable cell rate being set at the lowest cell rate under a certain condition in which the input rate is lower than the minimum cell rate.

2. The method of claim 1, wherein the allowable cell rate is set at the lowest cell rate in said step (d) when there is no cell traffic on the connection.

3. The method of claim 1, wherein the allowable cell rate is set at the lowest cell rate in said step (d) when the input rate is less than the lowest cell rate.

4. The method of claim 3, wherein the allowable cell rate is set at the input rate in said step (d) if the input rate is greater than the lowest cell rate but less than the minimum cell rate.

5. A cell transmitting apparatus transmitting cells to a cell receiving apparatus through a connection in a communication network, the connection having a minimum cell rate determined when the connection is set up, the cell transmitting apparatus comprising:

an input rate calculation unit measuring an input rate at which the cell transmitting apparatus is currently receiving cells to transmit on the connection; and an allowable rate calculation unit coupled to the input rate calculation unit, receiving cell rate information from the cell receiving apparatus, and determining an allowable cell rate within which the cell transmitting apparatus may transmit said cells on the connection, the allowable cell rate being determined from at least said input rate and said cell rate information, the allowable cell rate being set at a predetermined lowest cell rate under a certain condition in which the input rate is lower than the minimum cell rate, the predetermined lowest cell rate being lower than the minimum cell rate.

6. The cell transmitting apparatus of claim 5, wherein the allowable rate calculation unit makes the allowable cell rate equal to the predetermined lowest cell rate when there is no cell traffic on the connection.

7. The cell transmitting apparatus of claim 5, wherein the allowable rate calculation unit makes the allowable cell rate equal to the predetermined lowest cell rate when the input rate is less than the lowest cell rate.

8. The cell transmitting apparatus of claim 5, wherein the allowable rate calculation unit makes the allowable cell rate equal to the input rate when the input rate is greater than the lowest cell rate but less than the minimum cell rate.

9. A traffic control system for controlling cell traffic on a connection in a communication network, the connection having a minimum cell rate determined when the connection is set up, the traffic control system including a cell transmitting apparatus for transmitting cells on the connection and a cell receiving apparatus for receiving the transmitted cells and providing cell rate information to the cell transmitting apparatus, the cell transmitting apparatus comprising:

an input rate calculation unit measuring an input rate at which the cell transmitting apparatus is currently receiving cells to transmit on the connection; and an allowable rate calculation unit coupled to the input rate calculation unit, receiving said cell rate information from the cell receiving apparatus, and determining an allowable cell rate within which the cell transmitting apparatus may transmit said cells on the connection, the allowable cell rate being determined from at least said input rate and said cell rate information, the allowable cell rate being set at a predetermined lowest cell rate under a certain condition in which the input rate is lower than the minimum cell rate, the predetermined lowest cell rate being lower than the minimum cell rate.

10. The traffic control system of claim 9, further comprising a switching apparatus disposed between the cell transmitting apparatus and the cell receiving apparatus.

11. The traffic control system of claim 10, wherein the cell transmitting apparatus functions as an input line interface for the switching apparatus, and the cell receiving apparatus functions as an output line interface for the switching apparatus.

* * * * *